United States Patent
Tokunaga et al.

(10) Patent No.: US 6,926,253 B2
(45) Date of Patent: Aug. 9, 2005

(54) AIR PASSAGE CHANGEOVER DEVICE HAVING FILM SCREEN

(75) Inventors: Takahiro Tokunaga, Kosai (JP); Koji Ito, Nagoya (JP); Atsushi Kosaka, Okazaki (JP)

(73) Assignee: DENSO Corporation, Kariya (JP)

( * ) Notice: Subject to any disclaimer, the term of this patent is extended or adjusted under 35 U.S.C. 154(b) by 98 days.

(21) Appl. No.: 10/714,713

(22) Filed: Nov. 17, 2003

(65) Prior Publication Data

US 2004/0104372 A1 Jun. 3, 2004

(30) Foreign Application Priority Data

Nov. 28, 2002 (JP) ........................................ 2002-345366

(51) Int. Cl.$^7$ ................................................ B60H 1/00
(52) U.S. Cl. ...................... 251/368; 251/901; 454/121; 454/156; 454/160; 454/161; 165/42
(58) Field of Search ............................ 454/69, 75, 121, 454/126, 127, 152, 156, 141–143, 159–161; 251/208, 368, 901; 165/42, 43, 103, 202–204; 236/49.3

(56) References Cited

U.S. PATENT DOCUMENTS 5,326,315 A * 7/1994 Inoue et al.

* cited by examiner

Primary Examiner—J. Casimer Jacyna
(74) Attorney, Agent, or Firm—Harness, Dickey & Pierce, PLC

(57) ABSTRACT

An air passage in an air-conditioner such as an automotive air-conditioner is selectively opened or closed by moving a position of an opening formed on a film screen relative to the air passage. The film screen is coupled to a pair of rollers, forming a curved path between the pair of rollers guided by a guiding surface. The film screen is formed by laminating a first film made of resin and a second film made of woven fabric having a higher elongation rate for a temperature rise than the first film. The second film is positioned inside of the curved path to prevent a shape of the roller or the guiding surface from being easily transferred to the film screen.

5 Claims, 2 Drawing Sheets

AIR PASSAGE CHANGEOVER DEVICE HAVING FILM SCREEN

CROSS-REFERENCE TO RELATED APPLICATION

This application is based upon and claims benefit of priority of Japanese Patent Application No. 2002-345366 filed on Nov. 28, 2002, the content of which is incorporated herein by reference.

BACKGROUND OF THE INVENTION

1. Field of the Invention

The present invention relates to a device for changing over an air passage by moving a film screen. The device is adequately applicable to an automotive air-conditioner.

2. Description of Related Art

An example of a conventional film screen for use in controlling an air passage is disclosed in JP-A-5-201234. The film screen is formed by alternately laminating resin film layers and cloth layers, or by laminating a resin layer and a cloth layer. In this manner, the film screen strength in both tensile and bending force is secured. The film screen thus formed is disposed in the air passage, forming a curved or serpentine path. In the conventional device, a side of the curved or serpentine path at which the cloth layer or the resin layer is positioned is not considered. In other words, the cloth layer or the resin layer forming the film screen is arbitrarily positioned at a convex side or a concave side of the curved or serpentine path.

A film screen formed by laminating a resin film layer and a woven fabric layer has been actually tested in an automotive air-conditioner. It has been found out through the test that part of the film screen wound around a roller is deformed by heat to a shape of the roller and that the deformed part does not easily recover its original shape. This deformation is referred to as a "transferred deformation" because the shape of the roller engaging with the film screen is transferred to the film screen. The transferred deformation formed on the film screen prevents good sealing between an air-conditioner casing and the film screen. The transferred deformation generates an air leakage and vibrating noise.

SUMMARY OF THE INVENTION

The present invention has been made in view of the above-mentioned problem, and an object of the present invention is to provide an improved air passage changeover device using a film screen on which formation of the transferred deformation is suppressed.

An amount of air flowing through an air passage formed in an air-conditioner casing is controlled by moving a film screen disposed across the air passage. The film screen is coupled between a pair of rollers supported in the casing, thereby forming a curved path guided by a guiding surface or a guiding pin. The film screen is driven by rotating one of the pair of rollers. An opening (or openings) is formed on the film screen, and the air passage is selectively opened or closed by changing a position of the opening relative to the air passage.

The film screen is composed of a first film and second film bonded together with adhesive. The second film has a higher elongation rate for a temperature rise than the first film. The film screen is coupled to the pair of rollers so that the second film is positioned inside of the curved path and the first film is positioned outside of the curved path. If the second film having a higher elongation rate were positioned outside of the curved path, the shape of the roller or the guiding pin would be easily transferred to the film screen (formation of the transferred deformation). According to the present invention, the second film having a higher elongation rate is positioned inside of the curved path. Therefore, the formation of the transferred deformation on the film screen is effectively suppressed.

Preferably, the first film is made of a resin material such as polyethylene terephthalate, and the second film is made by weaving fabric made of the same resin material. An outer surface of the second film that slidably contacts the surface guiding the curved path may be coated with resin such as silicone resin to reduce abrasion between the film screen and the guiding surface.

Other objects and features of the present invention will become more readily apparent from a better understanding of the preferred embodiment described below with reference to the following drawings.

DETAILED DESCRIPTION OF THE PREFERRED EMBODIMENT

Figure 1:
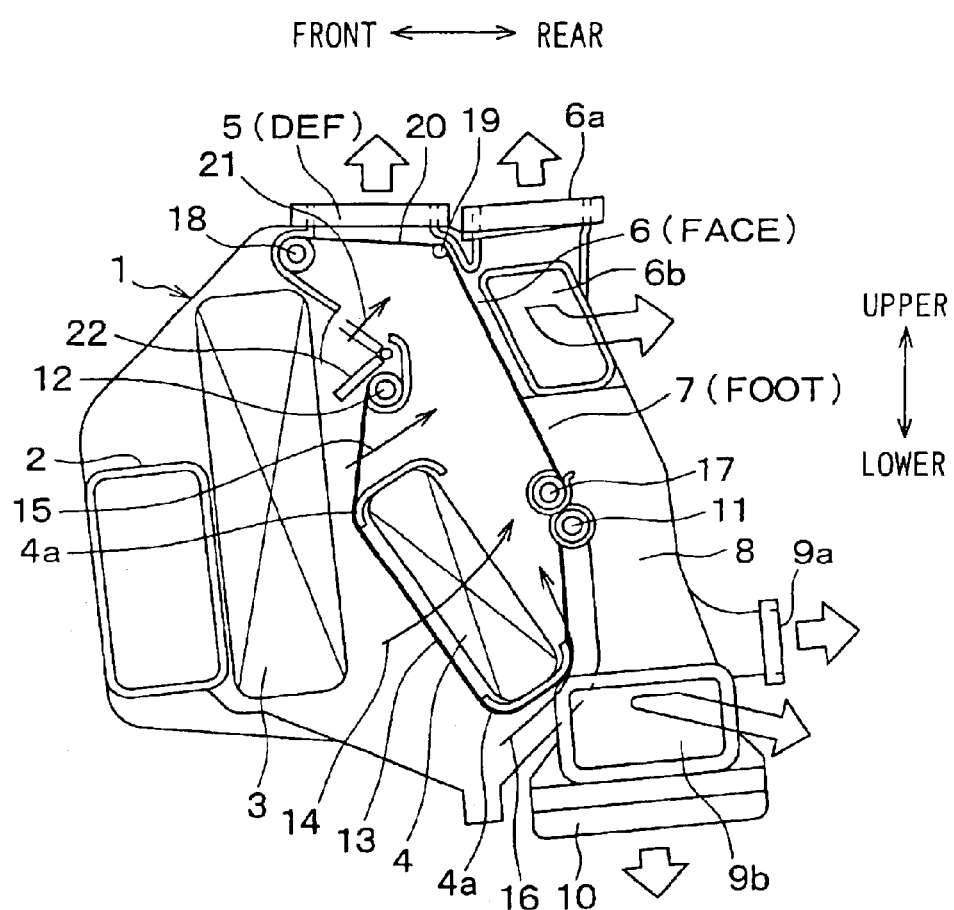
FIG. 1 is a cross-sectional view schematically showing an automotive air-conditioner.

A preferred embodiment of the present invention will be described with reference to the accompanying drawings. FIG. 1 shows an automotive air-conditioner to which an air passage changeover device according to the present invention is applied. An air-conditioner casing 1, made of resin, is disposed underneath an instrument panel and at a center portion of a vehicle. An air inlet port 2 is formed in the casing 1 at its front portion and is open toward a side of the vehicle. A blower unit (not shown) disposed under the instrument panel at an assistant seat side is connected to the air inlet port 2.

An evaporator 3 and a heater core 4 are disposed in the casing 1 in this order from its front side. The evaporator 3 is a heat-exchanger of a low pressure side in a well known vapor-compression-type refrigeration circuit. Air flowing through the evaporator 3 is cooled by evaporating refrigerant in the evaporator 3. Hot water circulating a water jacket of an internal combustion engine is supplied to the heater core 4. The heater core 4 heats air to be supplied to a passenger compartment.

At a downstream end of the air-conditioner casing 1, openings 5, 6 and 7 for blowing out conditioned air are formed, and air ducts for leading the conditioned air to respective positions are connected to the openings 5, 6, and 7. More particularly, a defroster duct for blowing the conditioned air toward a windshield is connected to the defroster-opening 5. The face-opening 6 is branched out to a center opening 6a and a side opening 6b. The center opening 6a is connected to a duct for blowing the conditioned air toward a center of an upper half of a front seat passenger. The side opening 6b is connected to a duct for blowing the conditioned air toward a side of an upper half of a front seat passenger.

A foot-passage 8 that is integrally formed with the casing 1 is connected to the foot-opening 7. The foot-passage 8 has a foot-outlet 9a for blowing the conditioned air toward a foot portion of a driver and another foot-duct 9b for blowing the conditioned air toward a foot portion of an assistance seat passenger. A rear foot opening 10 connected to a rear foot-duct (not shown) for supplying the conditioned air to a foot portion of rear seal passengers is formed at a lower portion of the foot-passage 8.

A first drive roller 11 and a first driven roller 12 are rotatably supported in the casing 1, and a film screen 13 for air-mixing is coupled to both rollers 11, 12. In other words, both ends of the film screen 13 are wound around the rollers 11, 12, respectively. The film screen 13 is flexible and forms a curved path between the drive roller 11 and the driven roller 12, guided by an outside surface of a heater core support 4a. The film screen 13 passes across a hot air passage 14 going through the heater core 4, a bypass passage 15 and another bypass passage 16. The film screen 13 is supported between both rollers 11, 12 with a predetermined tension.

The film screen 13 having openings for allowing air to flow therethrough is driven by the first drive roller 11 in both directions. Namely, the position of the openings formed on the film screen 13 is arbitrarily changed relative to the passages 14, 15, 16 by rotating the first drive roller 11 in both directions. The first drive roller 11 may be rotated by a stepper motor, for example. Thus, an amount of air flowing through the respective passages 14, 15, 16 is controlled.

A second drive roller 17 and a second driven roller 18 are rotatably supported in the casing 1, and another film screen 20 for switching blowing modes is coupled to both rollers 17, 18. In other words, both ends of the film screen 20 are wound around the rollers 17, 18, respectively. The film screen 20 is flexible and forms a curved path between the second drive roller 17 and the second driven roller 18, guided by an intermediate guide 19. The film screen 20 passes across the foot-opening 7, the face-opening 6 and a defroster-opening 5. The film screen 20 is supported between both rollers 17, 18 with a predetermined tension.

The film screen 20 having openings for allowing air to flow therethrough is driven by the second drive roller 17 in both directions. Namely, the position of the openings formed on the film screen 20 is arbitrarily changed relative to the openings 5, 6, 7 by rotating the second drive roller 17 in both directions. Thus, an amount of the conditioned air flowing through the respective openings 5, 6, 7 is controlled, thereby changing the blowing modes of the air-conditioner.

A cool air bypass passage 21 for directly leading air cooled by the evaporator 3 to the face-opening 6 is formed in the casing 1. The cool air bypass passage 21 is selectively opened or closed by a door 22. The cool air bypass passage 21 is opened when the air-conditioner is operated under a maximum cooling mode where the hot air passage 14 is fully closed and both bypass passages 15, 16 are fully opened by the film screen 13.

Figure 2:
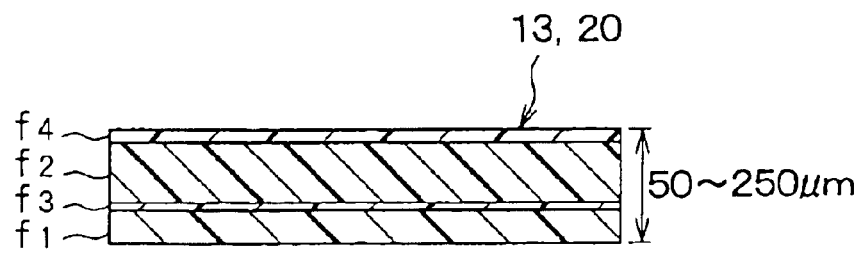
FIG. 2 is a cross-sectional view showing a film screen formed by laminating a resin film layer and a woven fabric layer.

As shown in FIG. 2, both film screens 13, 20 are formed by laminating a first film f1 and the second film f2. The second film f2 is made of a material having a higher elongation rate for a temperature rise than a material of which the first film f1 is made. In other words, the second film f2 elongates at a higher rate when heated than the first film f1. More particularly, the first film f1 is a resin film made of polyethylene terephthalate. The second film f2 is a woven fabric made by weaving polyethylene terephthalate fiber. The first film f1 and the second film f2 are bonded together by polyester-type adhesive f3. A surface of the second film f2 is coated with resin having a low friction coefficient such as silicone resin, thereby forming a coated film f4. The coated film f4 slidably contacts the outer surface of the heater core support 4a or the intermediate guide 19. A thickness of the film screen 13, 20 is 50–250 $\mu$m, and a thickness of the first film and the second film f2 is 25–125 $\mu$m each.

Figure 3:
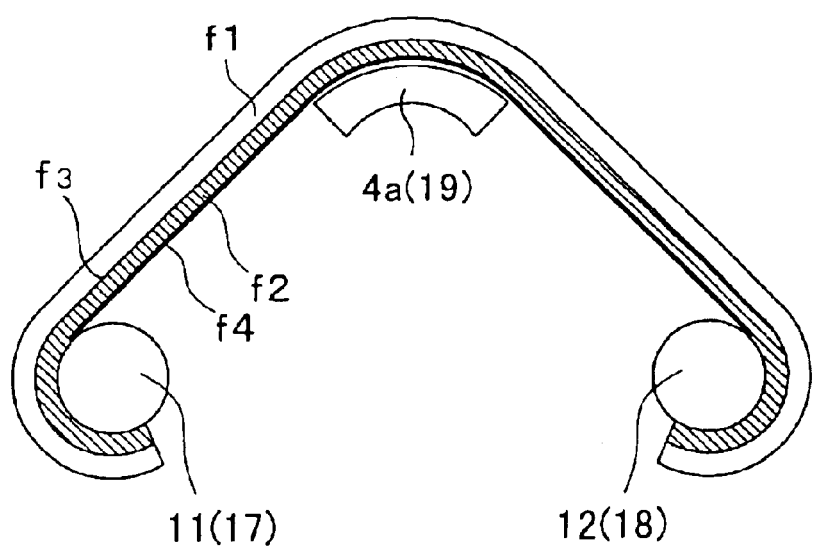
FIG. 3 is a schematic view showing a curved path of the film screen formed between a pair of rollers.

As schematically illustrated in FIG. 3 and shown in FIG. 1, the film screen 13 is supported between the first drive roller 1-1 and the first driven roller 12, forming a curved path guided by the outer surface of the heater core support 4a. The film screen 13 is disposed so that the second film f2 is positioned inside of the curved path. Similarly, the film screen 20 is supported between the second drive roller 17 and the second driven roller 18, forming a curved path guided by the intermediate guide 19. The film screen 20 is disposed so that the second film f2 is positioned inside of the curved path.

As atmospheric temperature surrounding the film screen 13, 20 rises, both of the first film f1 and the second film f2 are elongated. The second film f2 having a higher elongation rate is elongated more than the first film f1, thereby bending the film screen 13, 20 like a bimetal. If the second film f2 having a higher elongation rate were positioned outside of the curved path, the film screen 13, 20 would be easily deformed in a shape of the roller or the guide. This deformation is referred to as a transferred deformation because the shape of the roller or the guide is transferred to the film screen 13, 20. When the film screen 13, 20 is moved by rotating the driving roller after the transferred deformation is formed on the film screen, the transferred deformation forms a gap between the film screen and the casing 1, resulting in imperfect sealing and generation of vibrating noise.

According to the present invention, the second film f2 having a higher elongation rate is positioned inside of the curved path (a concave side) and the first film f1 having a lower elongation rate is positioned outside of the curved path (a convex side). Therefore, it is difficult for the film screen to deform in the shape of the roller or the guide. Thus, formation of the transferred deformation is suppressed, and disadvantages associated with the transferred deformation are alleviated.

Though the present invention is applied to the air passage changeover device in the automotive air-conditioner in the foregoing embodiment, the present invention is not limited to such application. While the present invention has been shown and described with reference to the foregoing preferred embodiment, it will be apparent to those skilled in the art that changes in form and detail may be made therein without departing from the scope of the invention as defined in the appended claims.

What is claimed is:

1. An air passage changeover device comprising:
   a pair of rollers rotatably supported in a casing that forms an air passage therein;
   a film screen coupled to the pair of rollers, forming a curved path between the pair of rollers, the film screen having an opening that selectively opens or closes the air passage by driving the film screen, wherein:
   the film screen comprises a first film and a second film, both laminated on each other, the second film having a higher elongation rate for a temperature rise than the first film; and
   the film screen is disposed so that the second film is positioned inside of the curved path.

2. The air passage changeover device as in claim 1, wherein:

the first film is made of resin and the second film is made of woven fabric.

3. The air passage changeover device as in claim 2, wherein:

the resin forming the first film is polyethylene terephthalate, and the woven fabric forming the second film is made by weaving fabric made of polyethylene terephthalate.

4. The air passage changeover device as in claim 1, wherein:

the first film and the second film are bonded together with adhesive, and an outer surface of the second film is coated with resin having a low friction coefficient.

5. The air passage changeover device as in claim 1, wherein:

the pair of rollers are adapted to wind the film screen therearound.

* * * * *